(12) United States Patent
Kim et al.

(10) Patent No.: US 12,534,018 B2
(45) Date of Patent: Jan. 27, 2026

(54) STRUCTURE FOR MOUNTING A MIRROR TO INSIDE OF A VEHICLE AND AN INSIDE REARVIEW MIRROR INCLUDING THE SAME

(71) Applicant: SMR Automotive Modules Korea Ltd., Cheongju-si (KR)

(72) Inventors: Suk Jin Kim, Incheon (KR); Kyung Jun Lee, Seoul (KR)

(73) Assignee: SMR Automotive Modules Korea Ltd., Cheongju-si (KR)

( * ) Notice: Subject to any disclaimer, the term of this patent is extended or adjusted under 35 U.S.C. 154(b) by 369 days.

(21) Appl. No.: 18/193,468

(22) Filed: Mar. 30, 2023

(65) Prior Publication Data

US 2023/0382301 A1 Nov. 30, 2023

(30) Foreign Application Priority Data

May 24, 2022 (KR) ........................ 10-2022-0063277

(51) Int. Cl.
*B60R 1/04* (2006.01)

(52) U.S. Cl.
CPC ..................................... *B60R 1/04* (2013.01)

(58) Field of Classification Search
CPC ....................................................... B60R 1/04
USPC ......................................... 359/871; 296/1.11
See application file for complete search history.

(56) References Cited

U.S. PATENT DOCUMENTS

| 5,377,948 A | 1/1995 | Suman et al. |
| 5,931,440 A | 8/1999 | Miller |
| 2001/0046095 A1 | 11/2001 | Rommel |
| 2011/0299185 A1 | 12/2011 | Rawlings et al. |
| 2022/0334348 A1 * | 10/2022 | Larson ................. G02B 7/182 |

FOREIGN PATENT DOCUMENTS

| KR | 1998-060857 U | 11/1998 | |
| KR | 10-0192938 B1 | 6/1999 | |
| KR | 10-2016-0009859 A | 1/2016 | |
| KR | 20220072665 A1 * | 6/2022 | ............... B60R 1/04 |
| KR | 20220136825 * | 10/2022 | ............... B60R 1/04 |
| WO | WO-03024744 A1 * | 3/2003 | ............... B60R 1/04 |

OTHER PUBLICATIONS

Machine translation of WO-03024744-A1 retrieved electronically from PE2E Search May 31, 2025 (Year: 2025).*
Machine translation of KR20220072665A1 retrieved electronically from PE2E Search May 31, 2025 (Year: 2025).*
Machine translation of KR20220136825 retrieved electronically from PE2E Search May 31, 2025 (Year: 2025).*

* cited by examiner

*Primary Examiner* — Cara E Rakowski
(74) *Attorney, Agent, or Firm* — BROADVIEW IP LAW, PC

(57) ABSTRACT

The disclosure relates to a bracket structure used for assembling an inside rearview mirror for a vehicle, and the bracket structure includes: a base member attached to an inside of a windshield for the vehicle; a bracket including an accommodation area formed therein; a press member including a mounting area and inserted into the accommodation area of the bracket to be positioned between the base member and the bracket; and a fastening member penetrating through a first penetrating hole and a second penetrating hole to fasten the bracket and the press member.

11 Claims, 11 Drawing Sheets

STRUCTURE FOR MOUNTING A MIRROR TO INSIDE OF A VEHICLE AND AN INSIDE REARVIEW MIRROR INCLUDING THE SAME

CROSS-REFERENCE TO RELATED APPLICATION(S)

This application is based on and claims priority under 35 U.S.C. § 119 to Korean Patent Application No. 10-2022-0063277, filed on May 24, 2022, in the Korean Intellectual Property Office, the disclosure of which is herein incorporated by reference in its entirety.

BACKGROUND

Field

The disclosure relates to a bracket structure which is used to mount an inside mirror for a vehicle to a windshield, and more particularly, to a bracket for an inside mirror for a vehicle which includes a separate press member, thereby having excellent durability against to an external force generated during an assembly process of the inside mirror for the vehicle.

Description of Related Art

In the auto industry, a process of mounting an inside mirror for a vehicle to a windshield of the vehicle is essential. In such an assembly process of mounting the inside mirror for the vehicle to the windshield, a base structure attached to the windshield and a bracket structure which accommodates the base structure and is connected with a main body of the inside mirror are normally used. However, in the assembly process of attaching the bracket structure to the windshield, an untended strong external force may be applied to a fastening member such as a screw, and as a result, the bracket structure may be broken frequently.

Accordingly, the disclosure relates to a bracket structure having an improved rigidity, and more particularly, to a bracket structure which further includes a press member for enhancing durability, thereby preventing breakage from an unintended external force.

SUMMARY

An object of the disclosure is to provide a bracket structure for a vehicle inside mirror which is prevented from being broken by an unintended external force generated in an assembly process.

According to an aspect of the disclosure, there is provided a bracket structure for mounting an inside rearview mirror to a vehicle, the bracket structure including: a base member attached to an inside of a windshield for the vehicle; a bracket including a first penetrating hole and an accommodation area formed therein; a press member including a second penetrating hole and a mounting area to have the base member mounted therein, the press member being inserted into the accommodation area of the bracket to be positioned between the base member and the bracket; and a fastening member penetrating through the first penetrating hole and the second penetrating hole to fasten the bracket and the press member, wherein the accommodation area includes a first accommodation area on which the first penetrating hole is formed, and a second accommodation area formed on a side surface of the first accommodation area, wherein the mounting area includes a first mounting area which has the second penetrating hole formed thereon and is inserted into the first accommodation area, and a second mounting area which is extended and curved from the first mounting area to enclose a side surface of the base member, at least part of the second mounting area corresponding to a shape of at least part of the second accommodation area to be inserted into the second accommodation area, wherein a tensile strength of the press member is greater than a tensile strength of the bracket, such that the second accommodation area is prevented from being broken by a tensile force of the press member when the first fastening member is coupled with the base member being inserted into the press member.

In addition, when the press member is inserted into the accommodation area, at least part of the second mounting area may be spaced apart from at least part of the second accommodation area.

In addition, when the fastening member is coupled, an amount of deformation of the braket may be smaller than an amount of deformation of the press member.

In addition, at least part of the second mounting area may be curved while forming an acute angle with the first mounting area to prevent the base member from being released when the base member is mounted on the press member.

In addition, the first accommodation area may further include at least one or more first accommodation protrusions for fixing the press member.

In addition, the first accommodation protrusion is inclined to guide insertion of the press member.

In addition, the first mounting area may further include at least one or more fixing protrusions for fixing the press member.

In addition, the fastening member may be coupled to the first penetrating hole and the second penetrating hole by screwing.

According to an aspect of the disclosure, there is provided a bracket structure for an inside rearview mirror of a vehicle which further includes a press member having a greater tensile strength than that of a housing to prevent breakage from a strong external force generated in a vehicle assembly process.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
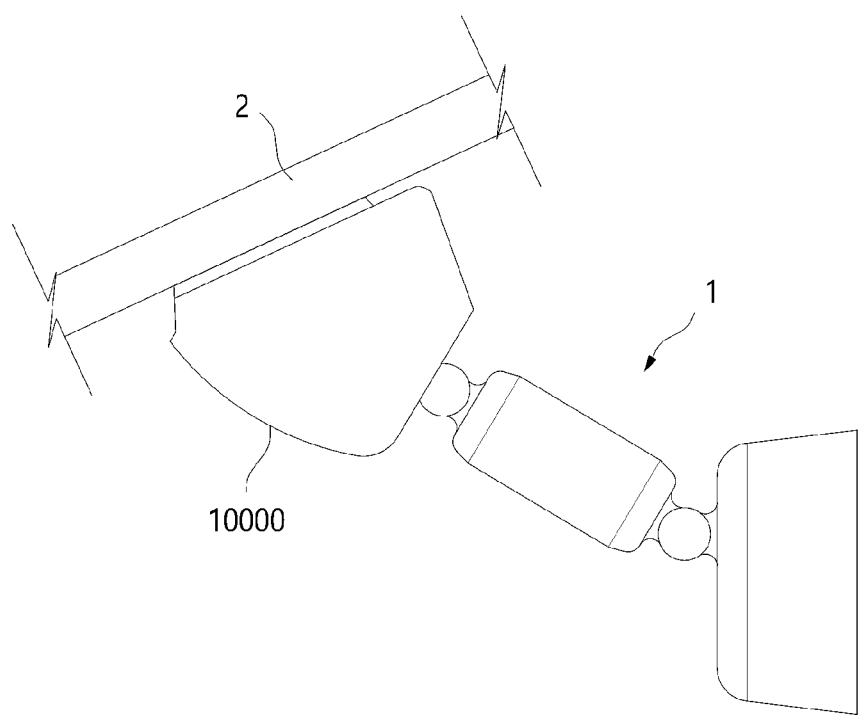
FIG. 1 is a view illustrating an implementation example of a bracket structure according to an embodiment.

Exemplary embodiments will now be described more fully with reference to the accompanying drawings to clarify objects, features and advantages of the disclosure. However, various changes may be made to the disclosure and various embodiments may be provided, and hereinafter, specific embodiments illustrated on the drawings will be described in detail.

In the drawings, thicknesses of layers and areas are exaggerated for the sake of clarity. In addition, it will be understood that when an element or a layer is referred to as being "on" another element or layer, the element may be directly on another element or layer or an intervening element or layer interposed therebetween. Throughout the specification, the same reference numerals indicate the same elements in principle. In addition, elements having the same function within the scope of the same technical concept illustrated on the drawings of respective embodiments will be described by using the same reference numeral.

Certain detailed explanations of well-known functions or constructions related to the disclosure are omitted when it is deemed that they may unnecessarily obscure the essence of the disclosure. Numbers used in the detailed descriptions of the disclosure (for example, such terms as 'first' and 'second') are merely identification signs for distinguishing one element from another element.

The terms "module" and "portion" and the terms having suffix "-er" or "-or" used in the detailed descriptions of the disclosure are given or interchangeably used only by considering easiness of drafting of the application, and does not have distinct meanings or roles in themselves.

The disclosure relates to a bracket structure which is installed in a vehicle to install a mirror for helping a driver to see the rear side of the vehicle. More specifically, the bracket structure according to an embodiment of the disclosure may be attached to a windshield in a vehicle to support an inside rearview mirror of the vehicle.

According to an embodiment, the bracket structure may include a press member. Due to the presence of the press member, the disclosure achieves the effects set forth hereinbelow. That is, the bracket structure according to an embodiment may have durability to withstand an excessive force applied during an installation process of an inside rearview mirror in a vehicle, thereby being prevented from being broken.

Hereinafter, the disclosure will be described with reference to the drawings.

Figure 2:
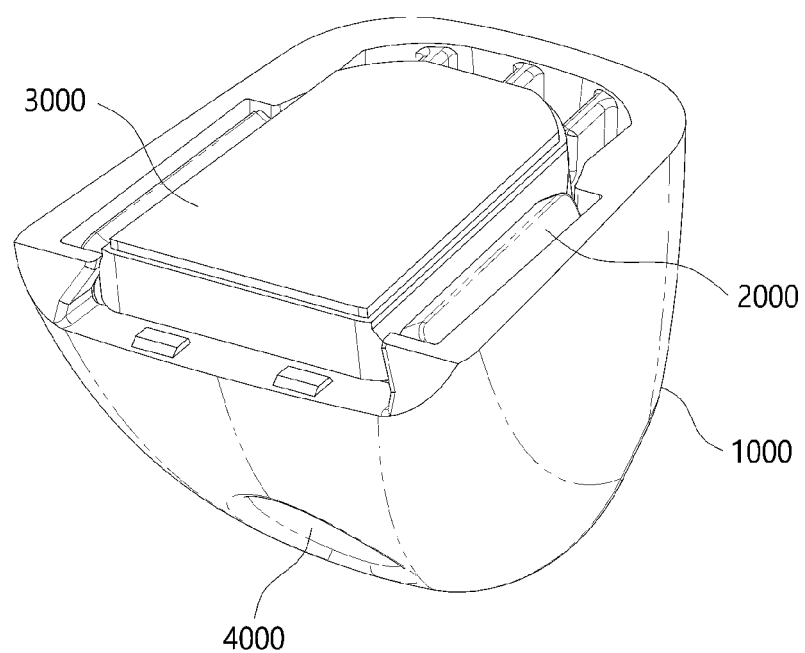
FIG. 2 is a view illustrating the whole bracket structure according to an embodiment.

Referring to FIGS. 1 and 2, an overall configuration of a bracket structure according to an embodiment, and an implementation example thereof will be described.

FIG. 1 is a view illustrating an implementation example of the bracket structure according to an embodiment, and FIG. 2 is a view illustrating the whole of the bracket structure according to an embodiment.

Referring to FIG. 1 first, the bracket structure 10000 according to an embodiment may be attached to a windshield 2 to support an inside rearview mirror 1 for a vehicle. Herein, the inside rearview mirror 1 for the vehicle may include a rear side viewing member to provide a rear side view to a driver, and a housing to accommodate the rear side viewing member. Specifically, the bracket structure 10000 may have one side attached to the windshield 2, and the other side connected to the inside rearview mirror 1.

Herein, although it is illustrated in the drawing that the bracket structure 10000 is attached to the windshield 2, the technical concept of the disclosure is not limited thereto. That is, the bracket structure 10000 according to an embodiment may be mounted at any position inside the vehicle where an inside rearview mirror is installed to provide a rear side view to a driver. For example, the bracket structure 10000 according to an embodiment may be mounted on an internal roof of the vehicle.

Referring to FIG. 2, the bracket structure 10000 according to an embodiment may include a housing 1000, a press member 2000, a base member 3000, and a fastening member 4000. Specifically, the housing 1000 may accommodate the press member 2000, and the bracket structure 10000 may be attached to the windshield 2 (see FIG. 1) with the base member 3000 being mounted in the press member 2000. More specifically, one surface 3200 (see FIG. 7) of the base member 3000 may be attached to the windshield 2 (see FIG. 1). The fastening member 4000 may be used to couple the housing 1000 and the press member 2000.

Hereinafter, a coupling structure of the bracket structure according to an embodiment will be described with reference to the drawings.

Figure 3:
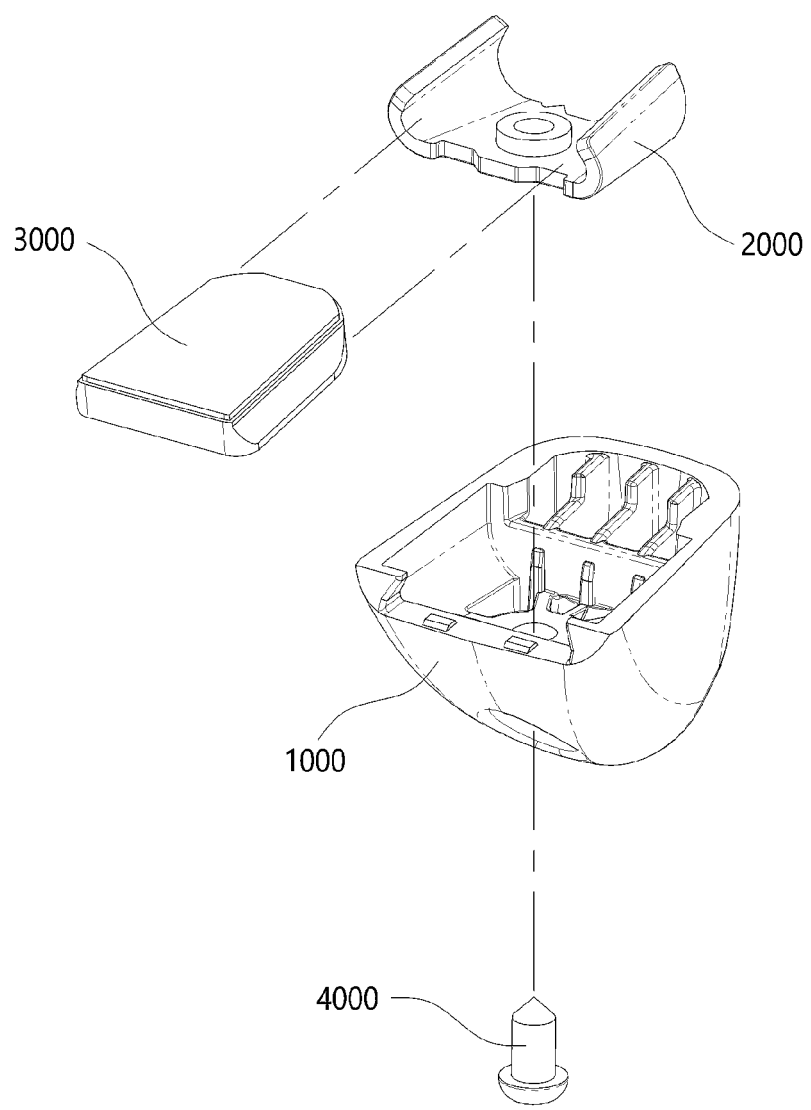
FIG. 3 is a half-section view illustrating a coupling structure of the bracket structure according to an embodiment.

FIG. 3 is a half-section view illustrating a coupling structure of the bracket structure according to an embodiment.

Hereinbelow, the disclosure will be described with reference to FIG. 3.

According to an embodiment, the press member 2000 may be inserted into the housing 1000 in a vertical direction, first. Herein, the housing 1000 may include an accommodation space formed therein to allow the press member 2000 to be inserted thereinto, which will be described in detail below.

When the press member 2000 is inserted, the base member 3000 is inserted into the housing 1000 in which the pressing member 2000 is mounted in a substantially horizontal direction. Specifically, the base member 3000 may be inserted into the housing 1000 and may be mounted in the press member 2000. Herein, the press member 2000 may have a shape corresponding to a shape of the base member 3000. Specifically, the press member 2000 may have both sides curved to correspond to shapes of both sides of the base member 3000, so that the base member 3000 is prevented from being released in a vertical direction after being inserted. This will be described in detail below.

In addition, the housing 1000 and the press member 2000 may include fastening member penetrating holes to allow the fastening member 400 to be fastened therethrough, respectively. The respective fastening member penetrating holes may be aligned with each other to allow the fastening member to penetrate therethrough.

In addition, the fastening member 4000 may penetrate through the housing 1000 and the press member 2000 and may apply pressure to the base member 3000, thereby securely coupling the base member 3000 into the bracket structure 10000. In this case, the press member 2000 has a greater tensile strength than that of the housing 1000, thereby preventing a breakage of the housing 1000 from pressure applied by the base member 3000. This will be described in detail below.

Hereinafter, respective components of the bracket structure according to an embodiment will be described in detail with reference to the drawings.

First, the housing according to an embodiment will be described with reference to FIG. 4.

Figure 4:
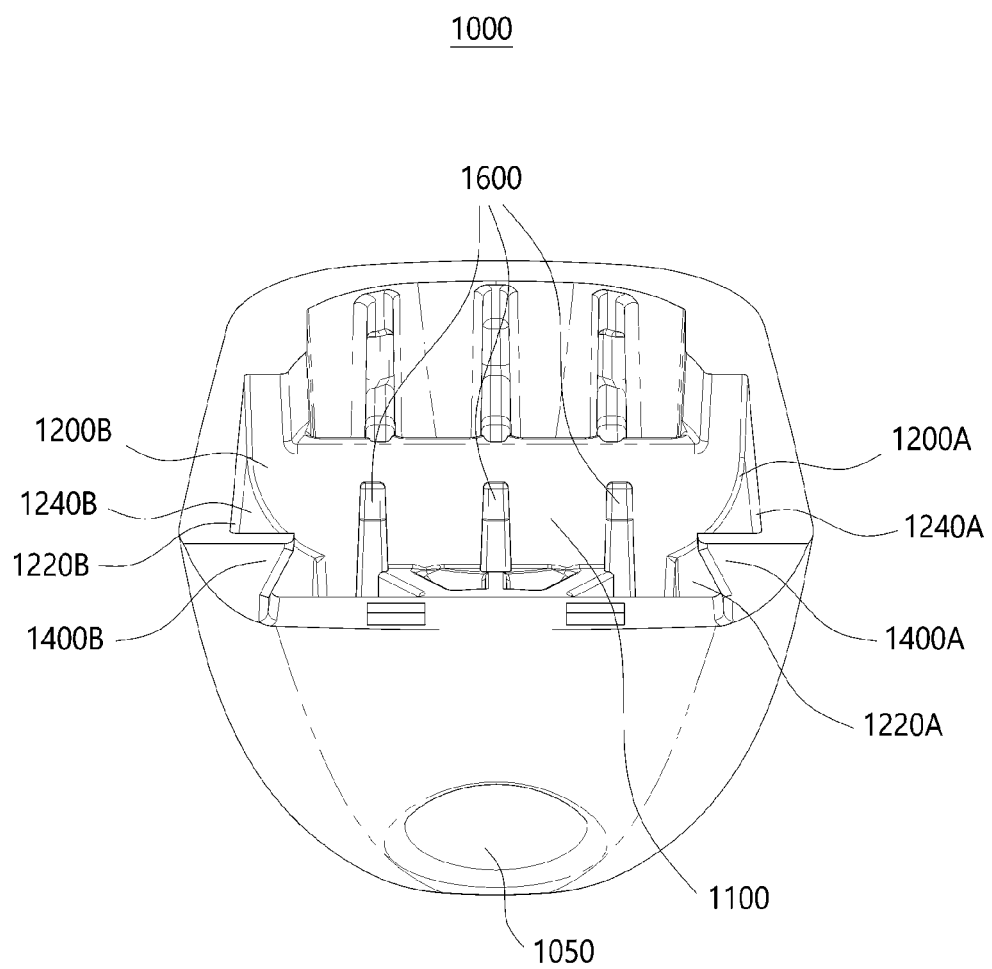
FIG. 4 is a view illustrating a housing according to an embodiment.

FIG. 4 illustrates the housing according to an embodiment.

In the disclosure, the term "housing" is used for the convenience of explanation by way of an example, but the technical concept of the disclosure is not limited by such a term. It will be understood that various terms such as a bracket, a cover, etc. performing the same function may be used.

Referring to FIG. 4, the housing 1000 according to an embodiment may include a first accommodation area 1100, second accommodation areas 1200A, 1200B, guide portions 1400A, 1400B, and a first fastening member penetrating hole 1050.

The first accommodation area 1100 accommodates a lower surface of the press member 2000. Specifically, the first accommodation area 1100 substantially corresponds to a shape of the lower surface of the press member 2000 to accommodate the press member 2000 to allow the press member 2000 to be seated in the housing 1000.

Figure 6:
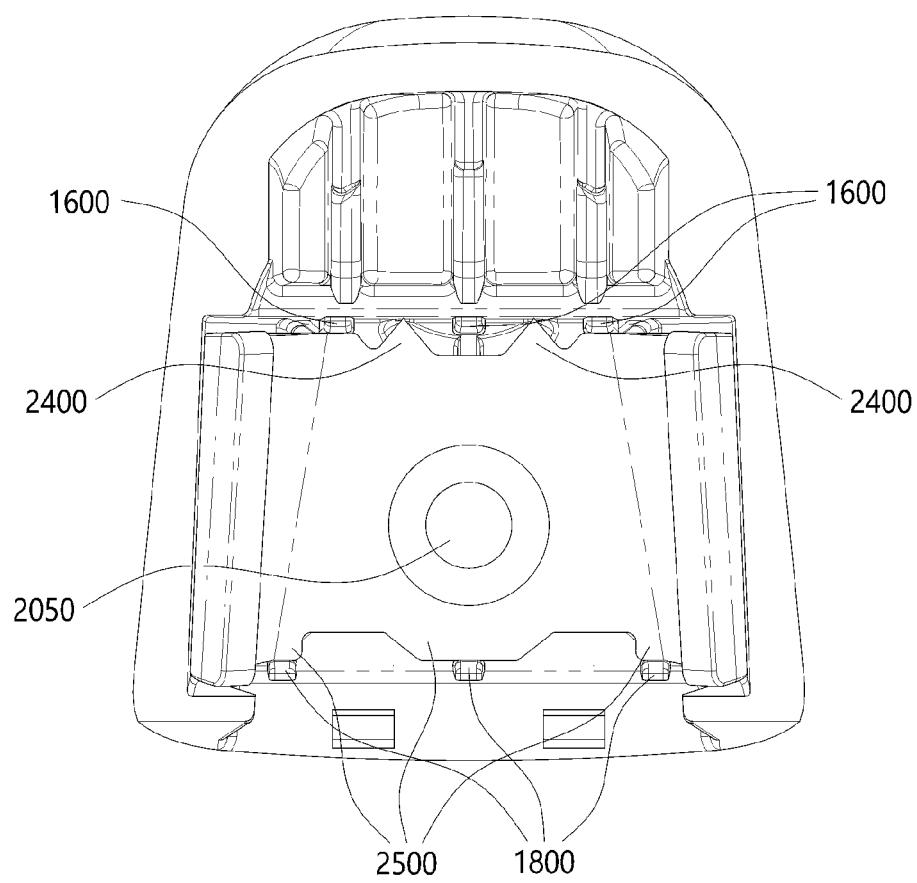
FIG. 6 is a view illustrating a coupling relationship between the housing and the press member according to an embodiment.

Herein, the first accommodation area 1100 may further include at least one or more first accommodation protrusions 1600 and at least one or more second accommodation protrusions 1800 (see FIG. 6).

The first accommodation protrusion 1600 protrudes toward an inside of the first accommodation area 1100 to come into contact with one side of the press member 2000. In addition, the first accommodation protrusion 1600 may be formed to be inclined. Specifically, the first accommodation protrusion 1600 may be inclined to further protrude toward a lower surface of the housing 1000. The first accommodation protrusion 1600 may be inclined, such that the first accommodation protrusion 1600 performs a guide role when the press member 2000 is inserted into the first accommodation area 1100. In addition, the first accommodation protrusion may be inclined, such that the press member 2000 and the first accommodation protrusion 1600 are coupled by press-fitting and a coupling force between the press member 2000 and the housing 1000 is enhanced.

The second accommodation protrusion 1800 (see FIG. 6) may be formed on the opposite side of the surface on which the first accommodation protrusion 1600 of the first accommodation area 1100 is formed. As will be described below, the second accommodation protrusion 1800 (see FIG. 6) may contact a second fixing protrusion 2500 of the press member 2000. Like the first accommodation protrusion 1600, the second accommodation protrusion 1800 (see FIG. 6) may be inclined to further protrude toward the lower surface of the housing 1000. The second accommodation protrusion 1800 (see FIG. 6) may perform a similar function to that of the first accommodation protrusion 1600, and thus a detailed description thereof is omitted.

In addition, the second accommodation areas 1200A, 1200B may be formed on both sides of the first accommodation area 1100. The second accommodation areas 1200A, 1200B may accommodate both side surfaces of the press member 2000. Herein, the second accommodation areas 1200A, 1200B may be formed in a curved shape. Specifically, the second accommodation areas 1200A, 1200*b* may be formed in the curved shape to correspond to shapes of the side surfaces of the press member 2000 and to accommodate the side surfaces of the press member 2000. More specifically, the second accommodation areas 1200A, 1200B may be formed in the curved shape to become narrower toward the lower surface of the housing 1000.

Herein, the second accommodation areas 1200A, 1200B may include press member spacing surfaces 1220A, 1220B and press member contact surfaces 1240A, 1240B, respectively.

The press member contact surfaces 1240A, 1240B may be formed on lower sides of the second accommodation areas 1200A, 1200B. The press member contact surfaces 1240A, 1240B may perform a function of supporting the press member 2000 in contact with at least part of the side surface of the press member 2000, respectively.

The press member spacing surfaces 1220A, 1220B may be formed on upper sides of the second accommodation areas 1200A, 1200B. The press member spacing surfaces 1220A, 1220B may be formed to be spaced apart from the press member 2000, respectively. The press member spacing surfaces 1220A, 1220B may be formed to be spaced apart from the press member 2000, such that, even when the base member 3000 applies a pressure to the press member 2000 and the press member 2000 is stretched in a transverse direction, a pressure caused by the tensile force of the press member 2000 is not transmitted to the second accommodation areas 1200A, 1200B and durability of the housing 1000 is enhanced. Preferably, the press member 2000 should be designed not to come into contact with the press member spacing surfaces 1220A, 1220B even when the press member 2000 is stretched in the transverse direction. However, this should not be considered as limiting, and the press member 2000 may be designed to come into contact with the second accommodation areas 1200A, 1200B when the press member 2000 is stretched.

In addition, the guide portions 1400B, 1400A may guide insertion of the base member 3000. Shapes of the guide portions 1400A, 1400B may correspond to shapes of the side surfaces of the base member 3000. In addition, the guide portions 1400A, 1400B may form an acute angle with one surface of the housing 1000, thereby preventing the base member 3000 from being released in a vertical direction.

In addition, the first fastening member penetrating hole 1050 may be formed on a lower surface of the housing 1000. The first fastening member penetrating hole 1050 may be aligned with a second fastening member penetrating hole 2050 (see FIG. 4), and the fastening member 4000 (see FIG. 3) is fastened by penetrating through the first fastening member penetrating hole 1050 and the second fastening member penetrating hole 2050 (see FIG. 4), thereby coupling the housing 1000 and the press member 2000.

Herein, it is preferable that the first fastening member penetrating hole 1050 and the fastening member 4000 are coupled by screwing, but this should not be considered as limiting, and it will be understood that various fastening methods are used.

Figure 5:
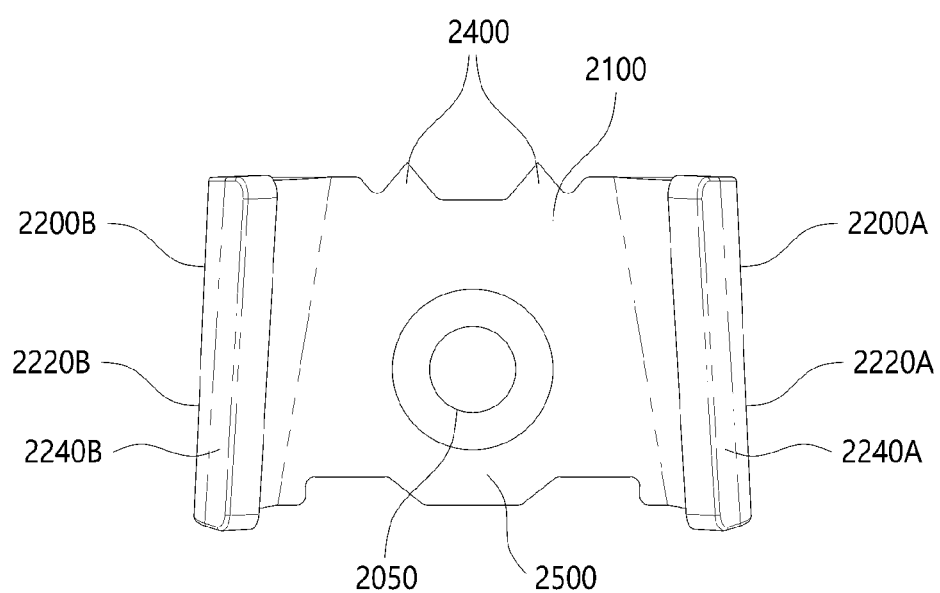
FIG. 5 is a view illustrating a press member according to an embodiment.

FIG. 5 illustrates the press member according to an embodiment.

Referring to FIG. 5, the press member 2000 according to an embodiment may include a first mounting area 2100 and second mounting areas 2200A, 2200B.

The first mounting area 2100 may be seated in the first accommodation area 1100 of the housing 1000. Herein, the first mounting area 2100 may further include at least one or more first fixing protrusions 2400. The first fixing protrusion 2400 may protrude from one side of the first mounting area 2100. The at least one or more first fixing protrusions 2400 may contact a part of an inner wall of the first accommodation area 1100 to provide a coupling force to fix the press member 2000 to the housing 1000. Herein, the first fixing protrusion 2400 may have a sharp tip to increase a coupling force with the housing 1000. More specifically, when the press member 2000 is inserted into the first accommodation area 1100 in the vertical direction, the first fixing protrusion 2400 may be press-fitted into a side wall of one side of the first accommodation area 1100, such that the press member 2000 is fixed to the first accommodation area 1100.

In addition, the first mounting area 2100 may further include at least one or more second fixing protrusions 2500. The second fixing protrusion 2500 may be formed on one side of the first mounting area 2100. Herein, the second fixing protrusion 2500 may be formed in the opposite direction of the direction in which the first fixing protrusion 2400 is formed.

The second fixing protrusion 2500 may come into contact with the second accommodation protrusion 1800, thereby providing a coupling force between the press member 2000 and the housing 1000. Specifically, the second fixing protrusion 2500 may be coupled with the second accommodation protrusion 1800 which is formed to be inclined toward the lower surface of the housing 100 by press-fitting, thereby providing a coupling force between the press member 2000 and the housing 1000.

The second mounting areas 2200A, 2200B may include support portions 2220A, 2220B and base contact portions 2240A, 2240B.

The support portions 2220A, 2220B may contact the press member contact surfaces 1240A, 1240B, respectively. The support portions 2220A, 2220B may come into contact with the press member contact surfaces 1240A, 1240B, respectively, such that the press member 2000 is seated in the housing 1000. Herein, the support portions 2220A, 2220B may be extended from the first mounting area 2100. Herein, the support portions 2220A, 2220B may have various shapes. For example, the support portions 2220A, 2220B may be extended from the first mounting area 2100 in a curved shape, or may be extended from the first mounting area 2100 and may be curved with a sharp exterior angle in the form of an edge. That is, the support portions 2220A, 2220B may be extended in any curved shape within the scope of the technical concept of the disclosure.

The base contact portions 2240A, 2240B may be extended from the support portions 2220A, 2220B. In addition, the base contact portions 2240A, 2240B may come into contact with the base member 300 on their inside portions. That is, inner surfaces of the base contact portions 2240A, 2240B may contact press member contact surfaces 3420A, 3420B of the base member 300 to support the base member 300 as will be described below. Herein, the base contact portions 2240A, 2240B may be formed to form an acute angle with the first mounting area 2100. The base contact portions 2240A, 2240B may form an acute angle with the first mounting area 2100, thereby preventing the base member 300 from being released from the press member 2000 in the vertical direction.

In addition, the base contact portions 2240A, 2240B may be disposed on the press member spacing surfaces 1220A, 1220B of the housing 1000. Preferably, the base contact portions 2240A, 2240B may be disposed without contacting the press member spacing surfaces 1220A, 1220B.

In addition, the press member 2000 may include the second fastening member penetrating hole 2050. The second fastening member penetrating hole 2050 may perform substantially the same function as the first fastening penetrating hole 1050, and thus a redundant explanation thereof is omitted.

However, the second fastening member penetrating hole may be manufactured without a screw thread. The second fastening member penetrating hole 2050 manufactured without the screw thread may form a screw thread thereon during secured with the fastening member 4000 Accordingly, a coupling force between the fastening member 4000 and the second fastening member penetrating hole 2040 may be enhanced.

According to an embodiment, the press member 2000 may be formed with various materials. However, it is preferable that the press member 200 is formed with a material having a greater tensile strength than that of a material of the housing 1000. For example, the press member 2000 according to an embodiment may be formed with a material like an iron plate but is not limited thereto.

FIG. 6 illustrates a coupling relationship between the housing and the press member according to an embodiment.

Referring to FIG. 6, a coupling relationship between the housing and the press member will be described.

Referring to FIG. 6, the press member 2000 may be inserted into the housing 1000.

Specifically, the first mounting area 2100 may be seated in the first accommodation area 1100. The at least one or more first fixing protrusions 2400 may be inserted into an inside wall of the first accommodation area 1100 by press-fitting. In addition, a part of the first mounting area 2100 may be inserted into the first accommodation area 1100 in contact with the at least one or more first accommodation protrusions 1600 by press-fitting. In addition, the first mounting area 2100 may be inserted into the first accommodation area 1100 such that the second fixing protrusion 2500 and the second accommodation protrusion 1800 are press-fitted.

In addition, the second mounting areas 2200A, 2200B may be seated in and supported on the second accommodation areas 1200.

Specifically, the support portions 2220A, 2220B may be inserted into the second accommodation areas 1200A, 1200B. That is, the supports portions 2220A, 2220B which are extended from the first mounting area 2100 and are curved may be seated on the press member contact surfaces 1240A, 1240B corresponding to shapes of the support portions 2220A, 2220B.

In addition, the base contact portions 2240A, 2240B may be inserted into the press member spacing surfaces 1220A, 1220B.

In addition, the first fastening member penetrating hole 1050 and the second fastening member penetrating hole 2050 may be formed to be aligned with each other when the press member 2000 is inserted into the housing 1000.

Figure 7:
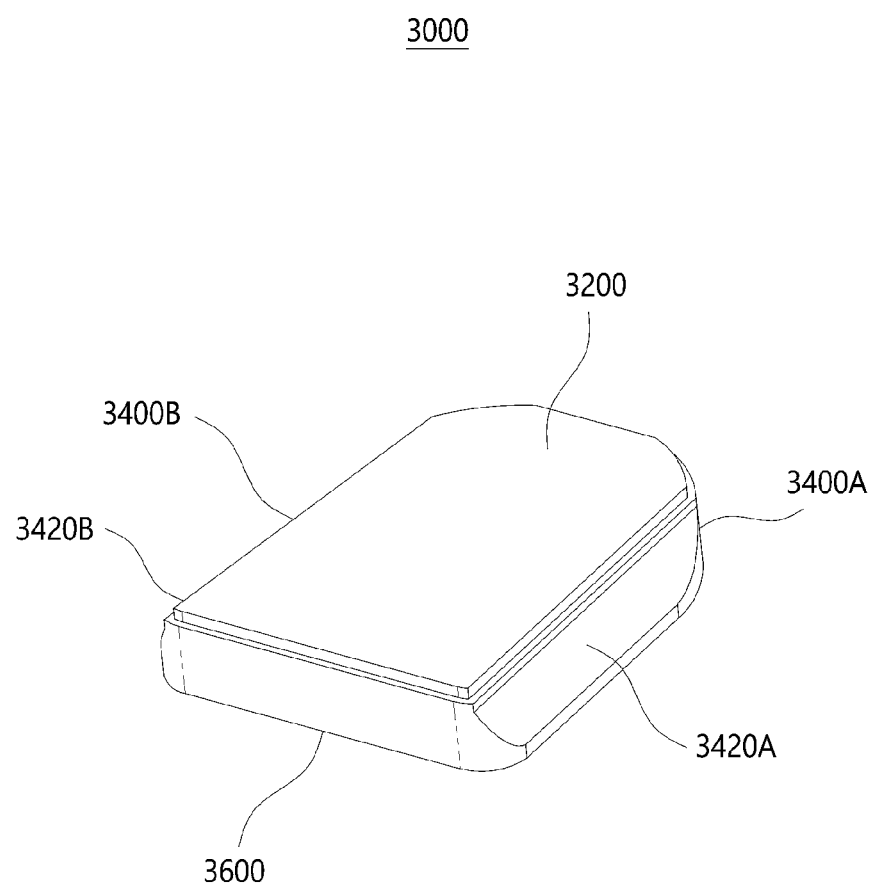
FIG. 7 is a view illustrating a base member according to an embodiment.

FIG. 7 illustrates the base member according to an embodiment.

Referring to FIG. 7, a configuration of the base member 3000 will be described.

According to an embodiment, the base member 3000 may include a windshield contact surface 3200, a lower surface 3600, and press member insertion portions 3400A, 3400B.

The windshield contact surface 3200 may come into contact with the windshield 2 (see FIG. 1) of the vehicle to allow the bracket structure 10000 to be mounted on the vehicle.

The lower surface 3600 may be formed on the opposite surface of the windshield contact surface 3200. The lower surface 3600 may be mounted on the first mounting area 2100 of the press member 2000. In addition, the lower surface 3600 may receive a pressure in the vertical direction by the fastening member 4000.

In addition, the press member insertion portions 3400A, 3400B may be formed on both sides of the base member 3000. The press member insertion portions 3400A, 3400B may be mounted in the second mounting areas 2200A, 2200B of the press member 2000. More specifically, exteriors of the press member insertion portions 3400A, 3400B may be formed to correspond to shapes of the base contact portions 2240A, 2240B, such that the press member contact surfaces 3420A, 3420B are supported in contact with inner surfaces of the base contact portions.

Figure 8:
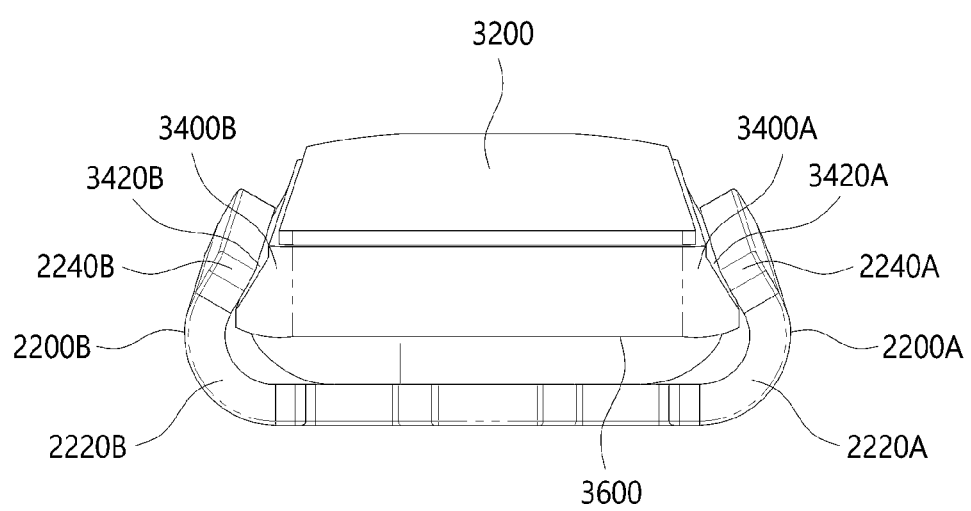
FIG. 8 is a view illustrating a coupling relationship between the base member and the press member according to an embodiment.

FIG. 8 illustrates a coupling relationship between the base member and the press member according to an embodiment.

Referring to FIG. 8, a coupling relationship when the base member 3000 is inserted into the press member 2000 will be described.

Referring to FIG. 8, the base member 3000 may be inserted into the press member 2000 in a horizontal direction. The shapes of the second mounting areas 2200A, 2200B of the press member 2000 may correspond to the shapes of the press member insertion portions 3400A, 3400B of the base member 3000, such that the base member 3000 is easily inserted.

When the base member 3000 is inserted into the press member 2000, the inner surfaces of the base contact portions 2240A, 2240B may come into contact with the press member contact surfaces 3420A, 3420B of the base member 3000. The inner surfaces of the base contact portions 2240A, 2240B and the shapes of the press member contact surfaces 3420A, 3420B may be inclined to correspond to each other. The inner surfaces of the base contact portions 2240A, 2240B and the shapes of the press member contact surfaces 3420A, 3420B correspond to each other, such that the base contact portions 2240A, 2240B and the press member contact surfaces 3420A, 3420B slide on each other and the base member 3000 moves in a vertical direction.

In addition, the lower surface 3600 may be seated on the first mounting area 2100. Specifically, the lower surface 3600 may come into contact with the second fastening member penetrating hole 2050. When the fastening member 4000 penetrates through the second fastening member penetrating hole 2050 and applies a force to the lower surface 3600, the base member 3000 may move in the vertical direction.

Hereinafter, a deformation of the bracket structure 1000 when the fastening member 4000 is coupled will be described with reference to the drawings.

Figure 9:
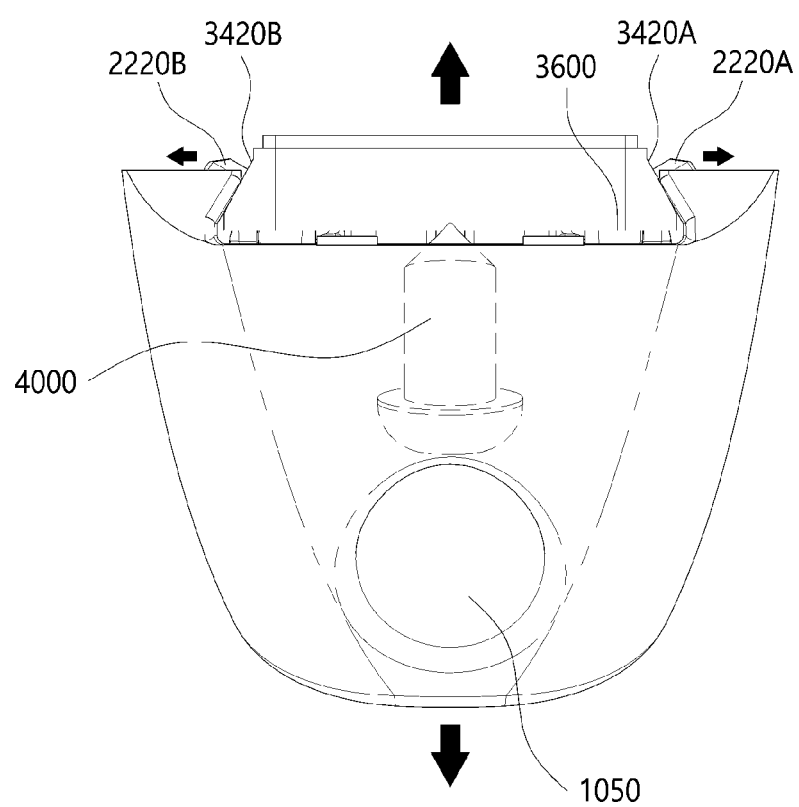
FIG. 9 is a view illustrating a deformation of the bracket structure caused by coupling by a fastening member.

FIG. 9 illustrates a deformation of the bracket structure caused by coupling by the fastening member.

Referring to FIG. 9, the fastening member 4000 is inserted into the first fastening member penetrating hole 1050. The inserted fastening member 4000 penetrates through the second fastening member penetrating hole 2050 and presses the lower surface of the base member 3000. Herein, the fastening member 400 and the first and second fastening member penetrating holes 1050, 2050 may be fastened to each other by screwing. Herein, as described above, the fastening member 4000 may be fastened to the second fastening member penetrating hole 2050 while forming a screw thread.

The base member 3000 the lower surface 3600 of which is pressed may move in the vertical direction along a pressing direction of the fastening member 4000. When the base member 3000 is moved in the vertical direction by the pressure of the fastening member 4000, the press member contact surfaces 3420A, 3420B may press the second mounting areas 2200A, 2200B. More specifically, the base contact portions 2240A, 2240B are formed at an acute angle relative to the first mounting area 2100. Accordingly, when the base member 3000 presses the base contact portions 2240A, 2240B in the vertical direction, the base contact portions 2240A, 2240B are stretched apart from each other in a horizontal direction corresponding to the inclined surfaces of the base contact portions 2240A, 2240B forming an acute angel with the first mounting area 2100.

In this case, the second accommodation areas 1200A, 1200B may be formed to be spaced apart from the base contact portions 2240A, 2240B, such that, even when the base contact portions 2240A, 2240B are stretched apart from each other in the horizontal direction, a pressure is not transmitted to the second accommodation areas 1200A, 1200B.

In addition, it is preferable that a tensile strength of a material forming the press member 2000 is greater than a tensile strength of a material forming the housing 1000, such that a breakage of the housing 1000 is prevented even when the base contact portions 2240A, 2240B are stretched apart from each other in the horizontal direction and transmit a pressure to the housing 1000.

In other words, when the base member 3000 is mounted in the housing 1000, the press member 2000 is disposed between the base member 3000 and the housing 1000, such that the fastening member 4000 couples the base member 3000 and the housing 1000 with a greater coupling force.

Specifically, the press member 2000 may be disposed between the housing 1000 and the base member 3000. The press member 2000 is disposed between the housing 1000 and the base member 3000, such that even when a force greater than a strength of a material forming the housing 1000 is applied to the fastening member 4000 and the fastening member 4000 presses the base member 3000, the press member 2000 supports the pressure from the base member 3000, first, and prevents a breakage of the housing 1000.

To summarize, when the fastening member 4000 presses the base member 3000 and is coupled while pushing the base member 3000 in the vertical direction, the press member contact surfaces 3420A, 3420B press the base contact portions 2240A, 2240B, and the base contact portions 2240A, 2240B are stretched apart from each other. Even when the base contact portions 2240A, 2240B are stretched apart from each other, the tensile strength of the press member 2000 is greater than the tensile strength of the housing 2000, so that a breakage of the housing 1000 is prevented. That is, an amount of deformation of the housing 1000 is smaller than an amount of deformation of the base contact portions 2240A, 2240B, so that a breakage of the housing 1000 is prevented.

As described above, the bracket structure 10000 including the press member 2000 for preventing a breakage of the housing 1000 according to an embodiment may enhance durability due to the presence of the press member 2000 and may prevent a breakage even when the fastening member 4000 is assembled with a stronger force than necessary due to the use of a tool such as a motor drill, etc. in an assembly process of the inside rearview mirror 1 (see FIG. 1) for the vehicle in the vehicle.

Figure 10:
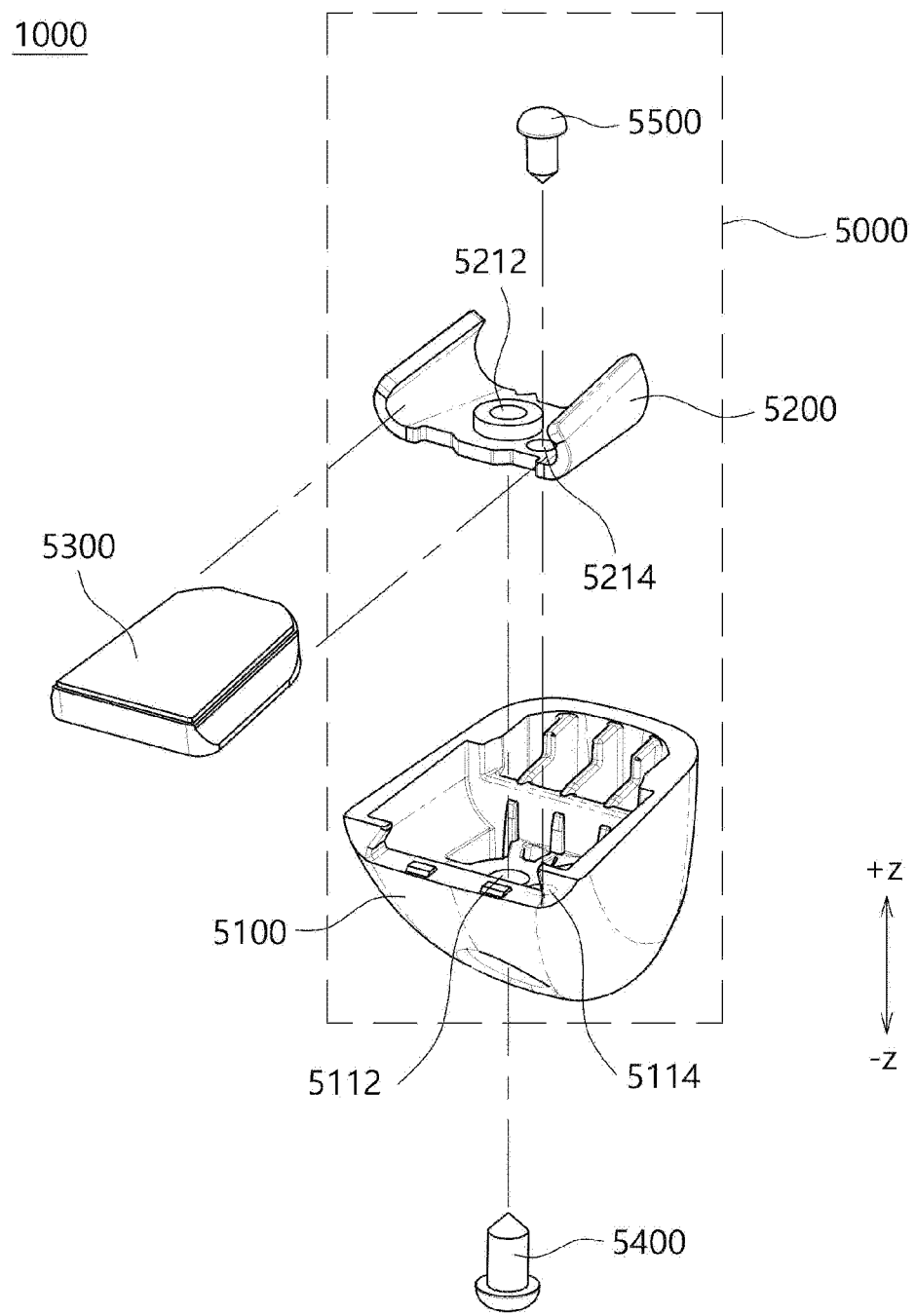
FIG. 10 is an exploded perspective view of an additional fastening member according various embodiments.
Figure 11:
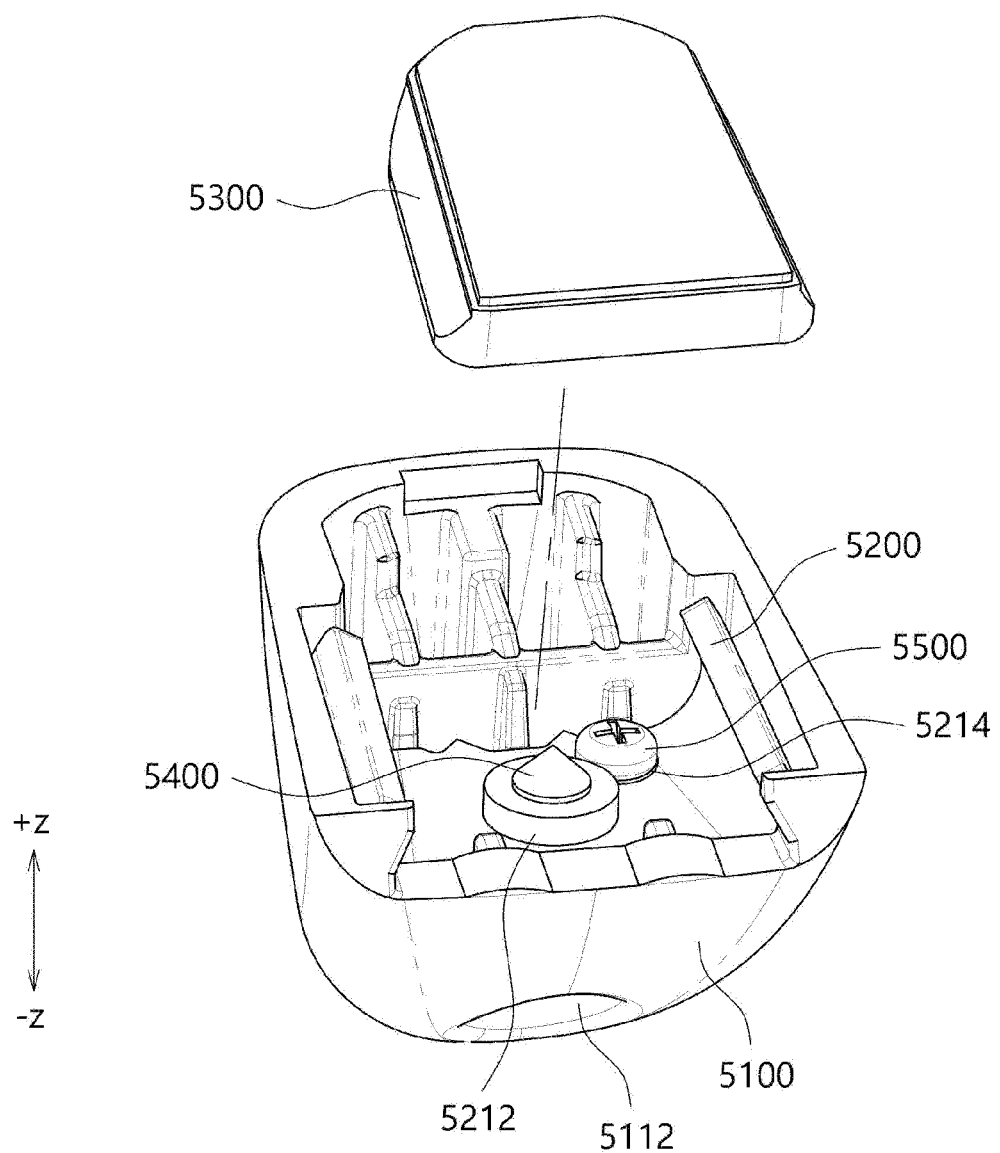
FIG. 11 is a view illustrating a bracket structure including the additional fastening structure according to various embodiments.

FIGS. 10 and 11 are views illustrating an additional fastening structure of a housing (for example, the housing 1000 of FIG. 4) and a press member (for example, the press member 2000 of FIG. 5) according to various embodiments.

FIG. 10 is an exploded perspective view of the additional fastening structure according to various embodiments. FIG. 11 is a perspective view illustrating a bracket structure including the additional fastening structure according to various embodiments.

Referring to FIGS. 10 and 11, the bracket structure 10001 may include all or a part of a housing 5100, a press member 5200, a base 5300, a first fastening member 5400, and a second fastening member 5500. In addition, the bracket structure 10001 according to an embodiment may include an additional fastening structure 5000. In addition, the additional fastening structure 5000 according to an embodiment may be provided by arrangement or combination of all or a part of the housing 5100, the press member 5200, and the second fastening member 5500. The housing 5100, the press member 5200, the base 5300, and the first fastening member 5400 of FIGS. 10 and 11 may have the same configurations as those of the housing (for example, the housing 1000 of FIG. 4), the press member (for example, the press member 2000 of FIG. the base member (for example, the base member 3000 of FIG. 7), and the first fastening member (for example, the first fastening member 4000 of FIG. 9) in the above-described embodiment in entirety or in part.

According to various embodiments, the press member 5200 may include a fourth fastening member penetrating hole 5214. In an embodiment, the fourth fastening member penetrating hole 5214 may be formed on a first mounting area 5210. For example, the fourth fastening member penetrating hole 5214 may be formed on the first mounting area 5210 in parallel with a second fastening member penetrating hole 5212.

According to various embodiments, the housing 5100 may include a third fastening member penetrating hole 5114. The third fastening member penetrating hole 5114 may be formed in proximity to a first fastening member penetrating hole 5112.

According to various embodiments, the third fastening member penetrating hole 5114 and the fourth fastening member penetrating hole 5214 may correspond to each other. For example, when the press member 5200 is disposed in the housing 5100, the third fastening member penetrating hole 5114 and the fourth fastening member penetrating hole 5214 may overlap each other at least in part. The second fastening member 5500 may be disposed to penetrate through the third fastening member penetrating hole 5114 and the fourth fastening member penetrating hole 5214 overlapping each other.

In a certain embodiment, the first fastening member 5400 and the second fastening member 5500 may be inserted to face in the opposite directions. For example, the first fastening member 5400 may be inserted from a vertical lower portion (−z axis direction) of the housing to a vertical upper portion (+z direction), and may be connected with the press member 5200. The second fastening member 5500 may be inserted from the vertical upper portion (+z axis direction) of the press member 5200 to the vertical lower portion (−z axis direction), and may be connected with the housing 5100. In other words, the first fastening member 5400 may be inserted through the housing 5100, first, and may be connected with the press member 5200 as described above, and the second fastening member 5500 may be inserted through the press member 5200, first, and may be connected with the housing 5100.

According to various embodiments, the second fastening member 500 may be assembled with the bracket structure 10001 before the first fastening member 5400. From the aspect of assembly of the bracket structure 10001, the first fastening member 5400 may be assembled lastly, so that coupling between the base member 5300 and the housing 5100 and/or the press member 5200 may be enhanced. In an embodiment, the second fastening member 5500 may couple between the housing 5100 and the press member 5200 first. That is, the housing 5100 and the press member 5200 may be disposed on right positions through the second fastening member 5500, and in this state, the base member 5300 may be inserted and disposed in the press member 5200 and/or the housing 5100. In addition, since the press member 5200 and the housing 5100 are coupled through the second fastening member 5500, the bracket assembly 10001 may be securely assembled without shaking of the press member 5200 even when the base member 5300 is mounted.

Although embodiments have been described with reference to specified embodiments and drawings as described above, various modifications and changes may be made from the above descriptions by a person skilled in the art. For example, even when the above-described technologies are performed in a different order from that described above, and/or components of the above-described structure, device, etc. are coupled or combined in different forms from that described above, or are replaced or substituted with other components or equivalents, appropriate results may be achieved.

Therefore, other implementations, other embodiments, and equivalents to the scope of the claims belong to the scope of the claims presented below.

What is claimed is:

1. A bracket structure for mounting a mirror to an inside of a vehicle, the bracket structure comprising:
    a bracket comprising a first penetrating hole and an accommodation area formed therein;
    a press member comprising a second penetrating hole and a mounting area to have a base member mounted therein, the base member being attached to an inside of the vehicle, the press member being inserted into the accommodation area of the bracket to be positioned between the base member and the bracket; and
    a first fastening member penetrating through the first penetrating hole and the second penetrating hole in a first direction to fasten the bracket and the press member,
    wherein the accommodation area comprises a first accommodation area on which the first penetrating hole is formed, and a second accommodation area formed on a side surface of the first accommodation area,
    wherein the mounting area comprises a first mounting area which has the second penetrating hole formed thereon and is inserted into the first accommodation area, and a second mounting area which is extended from the first mounting area to enclose a side surface of the base member, at least part of the second mounting area corresponding to a shape of at least part of the second accommodation area to be inserted into the second accommodation area,
    wherein a tensile strength of the press member is greater than a tensile strength of the bracket, such that the second accommodation area is prevented from being broken by a tensile force of the press member when the first fastening member is coupled with the base member being inserted into the press member,
    wherein, in a fastening process, the first fastening member presses a lower surface of the base member, thereby moving the base member in the first direction which is the same as a fastening direction of the first fastening member, such that the press member is stretched apart and a contact surface of the base member presses a base contact portion of the press member, wherein, when the press member is fully stretched apart, the base contact portion of the second mounting area that is pressed by the contact surface of the base member is spaced apart from the second accommodation area so that tensile force generated in the press member is not transmitted to the bracket, wherein the bracket structure further comprises an additional structure which is provided by a combination of the bracket and the press member, wherein the additional structure comprises:

a third penetrating hole formed on the first accommodation area in parallel with the first penetrating hole;

a fourth penetrating hole formed on the first mounting area in parallel with the second penetrating hole, and disposed to overlap the third penetrating hole at least in part; and a second fastening member configured to couple the third penetrating hole and the fourth penetrating hole.

2. The bracket structure of claim 1, wherein the second fastening member is inserted in a second direction opposite to the first direction and is disposed to couple the third penetrating hole and the fourth penetrating hole.

3. The bracket structure of claim 1, wherein, when the press member is inserted into the accommodation area, at least part of the second mounting area is spaced apart from at least part of the second accommodation area.

4. The bracket structure of claim 1, wherein, when the first fastening member is coupled, an amount of deformation of the bracket is smaller than an amount of deformation of the press member.

5. The bracket structure of claim 1, wherein at least part of the second mounting area forms an acute angle with the first mounting area to prevent the base member from being released when the base member is mounted on the press member.

6. The bracket structure of claim 1, wherein the first accommodation area further comprises at least one or more first accommodation protrusions for fixing the press member.

7. The bracket structure of claim 6, wherein the first accommodation protrusion is inclined to guide insertion of the press member.

8. The bracket structure of claim 1, wherein the first mounting area further comprises at least one or more fixing protrusions for fixing the press member.

9. The bracket structure of claim 1, wherein the first fastening member is coupled to the first penetrating hole and the second penetrating hole by screwing.

10. An inside rearview mirror for a vehicle, the inside rearview mirror comprising:

a rear side viewing member;

a housing configured to accommodate the rear side viewing member; and a bracket structure connected with at least part of the housing to mount the housing to an inside of the vehicle, wherein the bracket structure comprises:

a bracket comprising a first penetrating hole and an accommodation area formed therein;

a press member comprising a second penetrating hole and a mounting area to have a base member mounted therein, the base member being attached to an inside of the vehicle, the press member being inserted into the accommodation area of the bracket to be positioned between the base member and the bracket; and a first fastening member penetrating through the first penetrating hole and the second penetrating hole in a first direction to fasten the bracket and the press member, wherein the accommodation area comprises a first accommodation area on which the first penetrating hole is formed, and a second accommodation area formed on a side surface of the first accommodation area, wherein the mounting area comprises a first mounting area which has the second penetrating hole formed thereon and is inserted into the first accommodation area, and a second mounting area which is extended from the first mounting area to enclose a side surface of the base member, at least part of the second mounting area corresponding to a shape of at least part of the second accommodation area to be inserted into the second accommodation area, wherein a tensile strength of the press member is greater than a tensile strength of the bracket, such that the second accommodation area is prevented from being broken by a tensile force of the press member when the first fastening member is coupled with the base member being inserted into the press member, wherein, in a fastening process, the first fastening member presses a lower surface of the base member, thereby moving the base member in the first direction which is the same as a fastening direction of the first fastening member, such that the press member is stretched apart and a contact surface of the base member presses a base contact portion of the press member, wherein, when the press member is fully stretched apart, the base contact portion of the second mounting area that is pressed by the contact surface of the base member is spaced apart from the second accommodation area so that tensile force generated in the press member is not transmitted to the bracket, wherein the bracket structure further comprises an additional structure which is provided by a combination of the bracket and the press member, wherein the additional structure comprises:

a third penetrating hole formed on the first accommodation area in parallel with the first penetrating hole;

a fourth penetrating hole formed on the first mounting area in parallel with the second penetrating hole, and disposed to overlap the third penetrating hole at least in part; and a second fastening member configured to couple the third penetrating hole and the fourth penetrating hole.

11. The inside rearview mirror of claim 10, wherein the second fastening member is inserted in a second direction opposite to the first direction and is disposed to couple the third penetrating hole and the fourth penetrating hole.

* * * * *